United States Patent [19]

Unland et al.

[11] Patent Number: 5,502,966
[45] Date of Patent: Apr. 2, 1996

[54] PROTECTION SYSTEM FOR A PRESSURE-CHARGED INTERNAL COMBUSTION ENGINE AND METHOD OF OPERATION

[75] Inventors: Stefan Unland; Oskar Torno, both of Schwieberdingen; Werner Haeming, Neudenau; Ulrich Rothhaar, Stuttgart; Iwan Surjadi, Vaihingen/Enz; Wolfgang Hilbert, Möglingen; Robert Sloboda, Markgröningen; Michael Baeuerle, Besigheim, all of Germany

[73] Assignee: Robert Bosch GmbH, Stuttgart, Germany

[21] Appl. No.: 343,598

[22] PCT Filed: Feb. 23, 1994

[86] PCT No.: PCT/DE94/00182

§ 371 Date: Nov. 30, 1994

§ 102(e) Date: Nov. 30, 1994

[87] PCT Pub. No.: WO94/23190

PCT Pub. Date: Oct. 13, 1994

[30] Foreign Application Priority Data

Mar. 30, 1993 [DE] Germany ................ 43 10 261.1

[51] Int. Cl.⁶ .................... F02B 37/12; F02D 17/00; F02D 23/02
[52] U.S. Cl. .............. 601/603; 123/198 F; 123/198 D
[58] Field of Search ............... 60/601, 603, 605.1; 623/198 D, 198 DB, 198 F

[56] References Cited

U.S. PATENT DOCUMENTS

| | | |
|---|---|---|
| 4,044,560 | 8/1977 | Dorsch et al. . |
| 4,470,390 | 9/1984 | Omori et al. . |
| 4,603,552 | 8/1986 | Kido . |
| 4,633,670 | 1/1987 | Iwasa .................................. 60/603 |
| 4,685,435 | 8/1987 | Denz et al. ........................... 60/603 |

FOREIGN PATENT DOCUMENTS

| | | |
|---|---|---|
| 2529186 | 7/1975 | Germany . |
| 2928075 | 2/1981 | Germany . |
| 61-126335 | 6/1986 | Japan ................................ 60/603 |
| 64-41629 | 2/1989 | Japan ................................ 60/603 |

OTHER PUBLICATIONS

Patent Abstracts of Japan, vol. 15, No. 182 (M–1111) 10 May 1991 & JPA03 043 644 (Mitsubishi Motors Corp.) 25 Feb. 1991.
Patent Abstracts of Japan, vol. 11, No. 123 (M–581) 17 Apr. 1987 & JPA61 265 331 (Nissan Motor Co. Ltd.) 25 Nov. 1986.
Patent Abstracts of Japan, vol. 7, No. 44 (M–195) 22 Feb. 1983 & JPA57 193 737 (Toyo Kogyo KK) 29 Nov. 1982.
Patent Abstracts of Japan, vol. 9, No. 121 (M–382) 25 May 1985 & JPA60 006 029 (Honda Giken Kogyo KK) 12 Jan. 1985.

*Primary Examiner*—Michael Koczo
*Attorney, Agent, or Firm*—Kenyon & Kenyon

[57] ABSTRACT

A protection system for a pressure-charged (supercharged) combustion engine. In normal operation, the pressure-charging is controlled and/or regulated to a specifiable desired setpoint value P Setpoint. For the case of over-boosting of the internal combustion engine, various protective measures are provided, which are used in dependence upon the extent of over-boosting. In the case of a first protective measure, the control and/or regulation of the pressure-charging is switched off, and a final controlling element, which influences the pressure-charging, is adjusted to a predeterminable position. In the case of a second protective measure, the fuel metering to individual cylinders is interrupted in accordance with a predetermined skip pattern. If it is not possible to achieve an adequate reduction in the pressure-charging by this means, the system switches successively to further skip patterns with a higher skip frequency.

13 Claims, 3 Drawing Sheets

5,502,966

1

PROTECTION SYSTEM FOR A PRESSURE-CHARGED INTERNAL COMBUSTION ENGINE AND METHOD OF OPERATION

FIELD OF THE INVENTION

The present invention relates to a protection system for a pressure-charged (supercharged) combustion engine.

BACKGROUND INFORMATION

A system of this kind is known from German Unexamined Patent Application No. DE 25 29 186 (corresponding to U.S. Pat. No. 4,044,560). It discloses a boost-pressure control for a pressure-charged internal combustion engine. When a predetermined boost-pressure is exceeded, the entire fuel supply to the internal combustion engine is interrupted until the predetermined boost-pressure is undershot again. The interruption of the fuel supply is accomplished by switching off the fuel pump.

To control the power output of an internal combustion engine, German Patent Application No. DE 29 28 075 A1 has furthermore disclosed switching off individual cylinders in accordance with a predetermined pattern, the switch-off pattern being chosen so as to ensure that it is not always the same cylinders which are switched off.

The underlying object of the invention is to ensure optimum protection for a pressure-charged internal combustion engine.

SUMMARY OF THE INVENTION

The present invention has the advantage of making it possible to optimally protect a pressure-charged internal combustion engine from damage caused by excessive boost-pressure. The gradation of different protective measures in dependence upon the extent of over-boosting has a particularly advantageous effect. This ensures, on the one hand, that the respective protective measure taken is matched to the extent of over-boosting and that an unnecessarily severe torque drop is thus avoided. On the other hand, it is possible, by means of the different protective measures, to achieve particularly reliable protection of the internal combustion engine, which remains effective even when, for example, the final controlling element for controlling and/or regulating the pressure-charging has jammed.

With regard to the pressure-charging of the internal combustion engine, a distinction is drawn between three operating states, namely normal operation, the first stage of over-boosting and the second stage of over-boosting.

Normal operation exists when a variable which characterizes the pressure-charging lies below a first threshold value P1. In normal operation, the pressure charging of the internal combustion engine is controlled and/or regulated to a specifiable desired value of the present invention, P Setpoint, depending on the exemplary embodiment.

The first stage of over-boosting exists when the first threshold value P1 for the pressure-charging has been exceeded for longer than a predeterminable first time period t1Max. In this case, an intervention into the control and/or the regulation of the pressure-charging is performed. For example, the control and/or regulation system is switched off and the final controlling element which influences the pressure-charging is adjusted to a predeterminable position. Waiting for the first time period t1Max offers the advantage that erroneous triggering of the protection system, for example due to an overshoot in the control loop for the pressure-charging or due to an incorrect measured value, can largely be avoided.

The second stage of over-boosting exists when the measure introduced in the first stage of over-boosting to reduce the pressure-charging has not had a sufficient effect, i.e. when a second threshold value P2 for the pressure-charging has been exceeded for longer than a predeterminable second time period t2Max. In the second stage of over-boosting, the fuel metering to individual cylinders is initially interrupted in accordance with a first skip pattern. If this measure does not lead to the second threshold value P2 for the pressure-charging being undershot again within a third time period t3Max, a second skip pattern with a higher skip frequency is activated. Further skip patterns can follow, depending on the exemplary embodiment. Skipping individual cylinders instead of a global cut-off of fuel metering has the advantage that an abrupt torque drop is avoided since the maximum torque drop can be predetermined by way of the skip pattern. The provision of various skip patterns ensures that optimum protective measures are available for each of a very wide variety of operating situations. The skip patterns are advantageously matched to the number of cylinders in such a way that revolving skip sequences are obtained, i.e. within a very short time each cylinder is relieved of load.

As soon as the pressure-charging falls below the second threshold value P2 again, the protective measures taken in the second stage of over-boosting are canceled again. The same applies to the first threshold value P1 and the first stage of over-boosting.

The second threshold value P2 for the pressure charging is read-out from a characteristic map dependent on the speed n of the internal combustion engine and the temperature TL of the inducted air, or is determined by means of an algorithm into which the speed n of the internal combustion engine and the temperature TL of the induced air enter as input variables. This ensures that an optimum second threshold value P2 is available for the entire operating range of the internal combustion engine. Since the first threshold value P1 is determined from the second threshold value P2 by subtracting a constant dP, this also applies to the first threshold value P1.

A further advantage of the present invention lies in its universal applicability. It is, for example, possible for the boost-pressure P or the air mass or the air flow rate L to be selected as the variable which characterizes the pressure-charging of the internal combustion engine.

DETAILED DESCRIPTION OF THE INVENTION

The protection system according to the present invention is described below with reference to exemplary embodiments in which the pressure-charging of the internal combustion engine is characterized by the boost-pressure P. However, the present invention is not limited to this application. As already explained above, the pressure-charging of the internal combustion engine also can be characterized by the inducted air mass or the air flow rate L. In the exemplary embodiments described, the boost-pressure P can be replaced by any of these variables.

Figure 1:
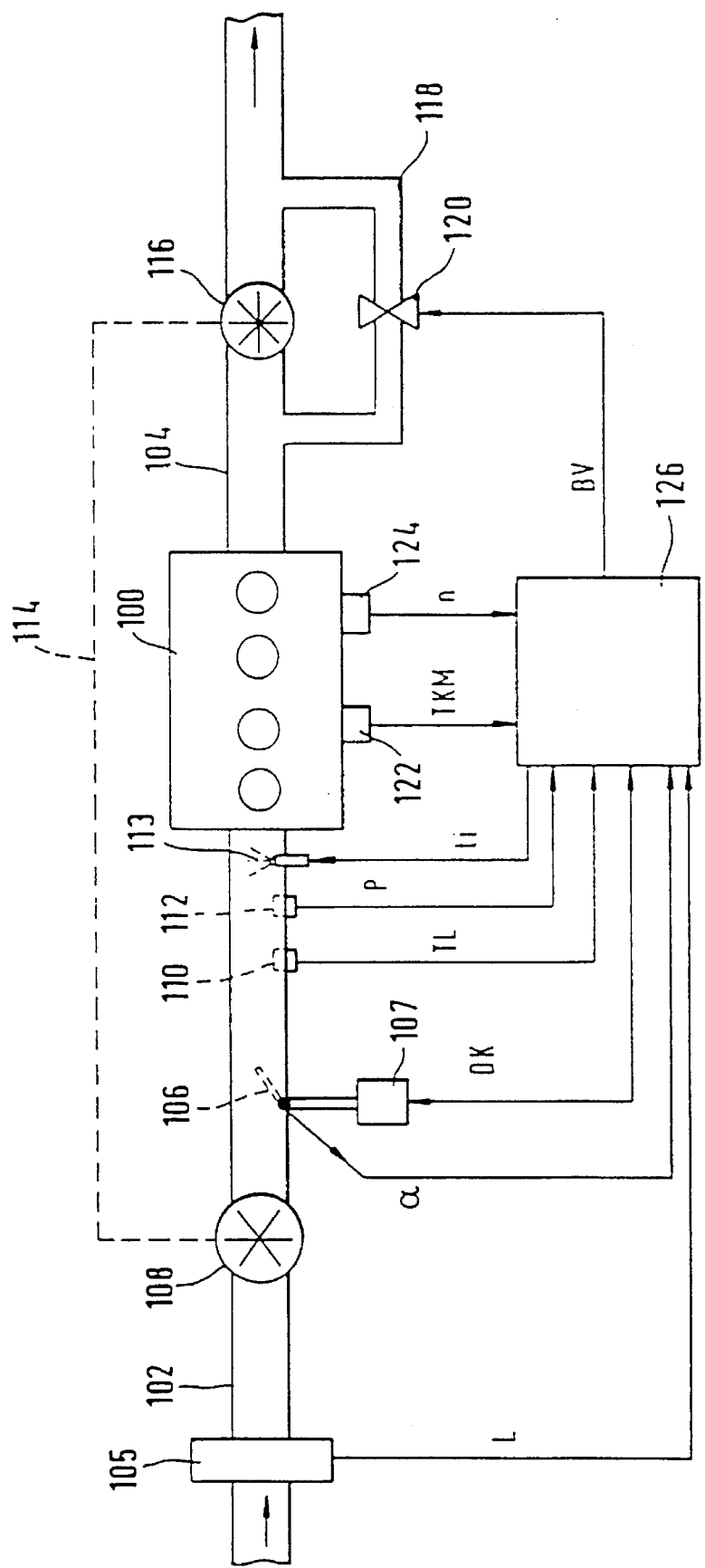
FIG. 1 shows a schematic representation of a pressure-charged internal combustion engine having a protection system according to the present invention.

FIG. 1 shows an internal combustion engine 100 with an intake section 102 and an exhaust duct 104. Arranged in the intake section 102—as seen in the direction of flow of the inducted air—are an air flow or air mass meter 105, a compressor 108, a throttle valve 106 connected to a drive 107, a temperature sensor 110 for detecting the temperature TL of the air inducted by the internal combustion engine 100, a pressure sensor 112 for detecting the boost-pressure P and one or more injection nozzles 113. The compressor 108 is driven via a connecting means 114 by a turbine 116 arranged in the exhaust duct 104. A bypass line 118 leads around the turbine 116. Arranged in the bypass line 118 there is a bypass valve 120. A temperature sensor 122 for detecting the temperature TKM of the coolant and an engine-speed sensor 124 for detecting the speed n of the internal combustion engine 100 are mounted on the internal combustion engine 100. All the sensors are connected to a central control unit 126. The central control unit 126 is also connected to the throttle valve 106, the drive 107, the injection nozzle or injection nozzles 113 and the bypass valve 120.

In detail, the control unit is supplied with the following signals: a signal L from the air flow or air mass meter 105 or a signal P from the pressure sensor 112, a signal from the throttle valve 106, a signal TL from the temperature sensor 110, a signal TKM from the temperature sensor 122 and a signal n from the engine-speed sensor 124. The control unit 126 outputs a signal DK to the drive 107, a signal ti to the injection nozzle or injection nozzles 113 and a signal BV to the bypass valve 120.

The protection system according to the present invention is contained in the control unit 126. If one or more of the described sensor signals indicates that the internal combustion engine 100 is being over-boosted, then, within the scope of the protection system according to the present invention, the bypass valve 120 is first of all adjusted to a predeterminable position (e.g. completely open), with the result that the speed of the turbine 116 decreases and if necessary, the control of the injection valve or injection valves 113 is then modified so as to ensure that individual cylinders have no fuel metered to them.

Figure 2:
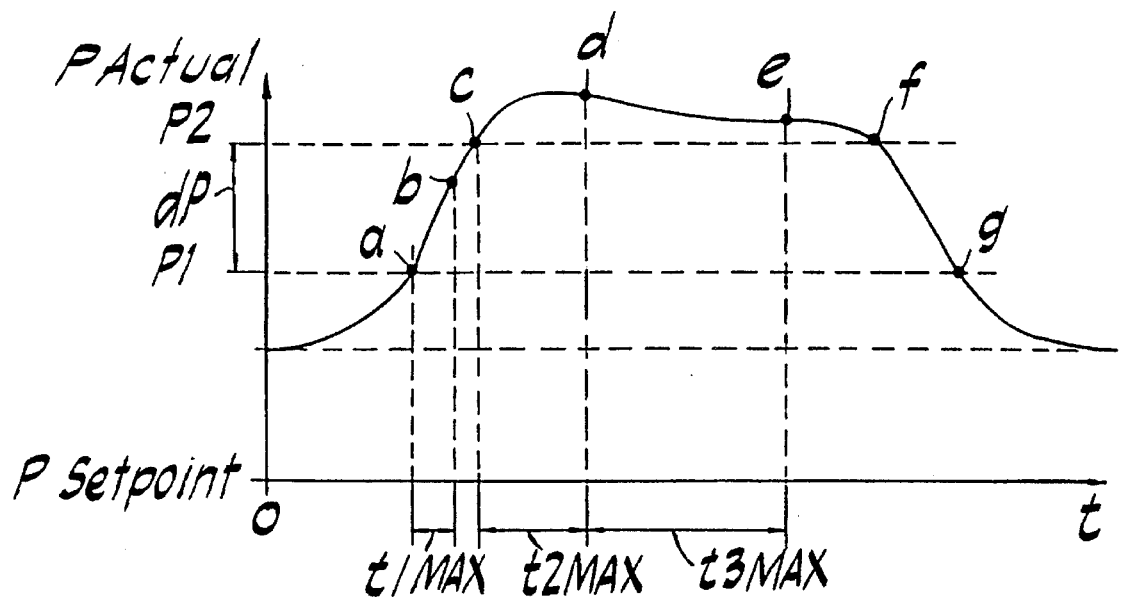
FIG. 2 shows an illustrative diagram of the time characteristic of the actual boost-pressure value, P Actual, on which is plotted the threshold values $P_1$ and $P_2$ and the time intervals $t_1$Max, $t_2$Max and $t_3$Max used in the protection system according to the present invention.

The diagram in FIG. 2 represents an example of the time characteristic of the actual value, P Actual, of the boost-pressure P. The time t is plotted on the abscissa and the actual boot-pressure value P Actual is plotted on the ordinate. The boost-pressure P can be used in addition to other variables, such as, for example, the air flow rate or air mass L etc., to assess the supercharging condition of the internal combustion engine 100. The variation of the actual boost-pressure value P Actual is represented by a solid line. Vertical broken lines delimit different time intervals t1Max, t2Max and t3Max. Horizontal broken lines indicate the desired setpoint boost-pressure value, P Setpoint, and the threshold values P1 and P2 respectively.

At time t=O, the actual boost-pressure value P Actual corresponds to the desired setpoint boost-pressure value P Setpoint. The actual boost-pressure value P Actual then rises due, for example, to a disturbance in the boost-pressure control system and, at point a, reaches the first threshold value P1. After a time period t1Max, measured from point a, point b is reached where the actual boost-pressure value P Actual is even further above the threshold value P1. At point b, as a first protective measure, the boost-pressure control is switched off, i.e. the bypass valve is fully opened. If, despite this first protective measure—as in the present case—the actual boost-pressure value P Actual also exceeds the threshold value P2 (point c) which lies by a value dP above the threshold value P1, because of a defective bypass valve 120 for example, and remains above the threshold value P2 for a time period t2Max, an intervention into the fuel metering is performed as a further protective measure (point d). In the case of a four-cylinder internal combustion engine, this intervention in the fuel metering consists, for example, in the skipping of every fifth fuel metering operation. In the example under consideration, the actual boost-pressure value P Actual starts to fall from point d. However, the actual boost-pressure value P Actual is still above the threshold value P2 (point e) after a time period t3Max since point d was reached. A further intervention in the fuel metering is therefore performed at point e, more specifically such that, in the case of a four-cylinder engine for example, every third fuel metering operation is skipped. In the present example, the actual boost-pressure value P Actual is thereby reduced further and, at point f, falls below the threshold value P2. At point f, all skips in the fuel metering are canceled again. However, boost-pressure regulation is switched on again only at point g, at which point the actual boost-pressure value P Actual falls below the threshold value P1. If there is no longer a disturbance in the boost-pressure regulation system, the actual boost-pressure value P Actual reaches the desired setpoint boost-pressure value P Setpoint again a short time after point g.

Figure 3:
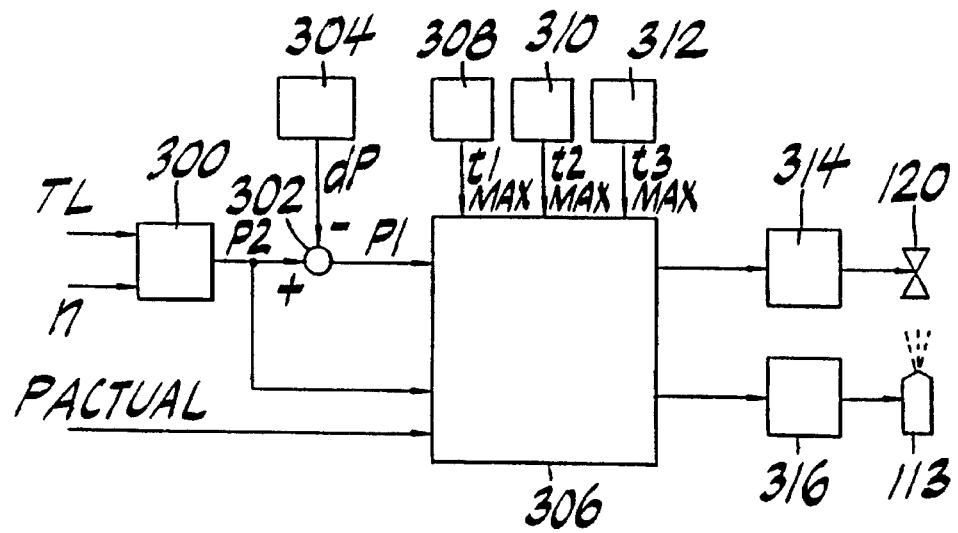
FIG. 3 shows an illustrative block diagram of the protection system according to the present invention.

FIG. 3 shows a block diagram of the protection system according to the present invention. A characteristic map 300 determines the threshold value P2 from the variables intake-air temperature TL and speed n of the internal combustion engine 100 and routes it to a node 302. At the node 302, a value dP, which is read out from a read-only memory 304 is subtracted from the threshold value P2. The result of the subtraction, the threshold value P1, is routed to one input of a block 306. The threshold value P2, the actual boost-pressure value P Actual and values for the time intervals t1Max, t2Max and t3Max, which are output by read only memories 308, 310 and 312, are applied to further inputs of the block 306. Using the method illustrated in the flowchart in FIG. 4, the block 306 determines whether an intervention in the boost-pressure control or in the fuel metering is required to protect the internal combustion engine 100. If an intervention in the boost-pressure control is required, the block 306 outputs a corresponding signal to the boost-pressure control 314, which triggers the bypass valve 120. If an intervention in the fuel metering is required, the block 306 outputs a corresponding signal to the fuel metering system 316, which controls the injection nozzle or injection nozzles 113.

Figure 4:
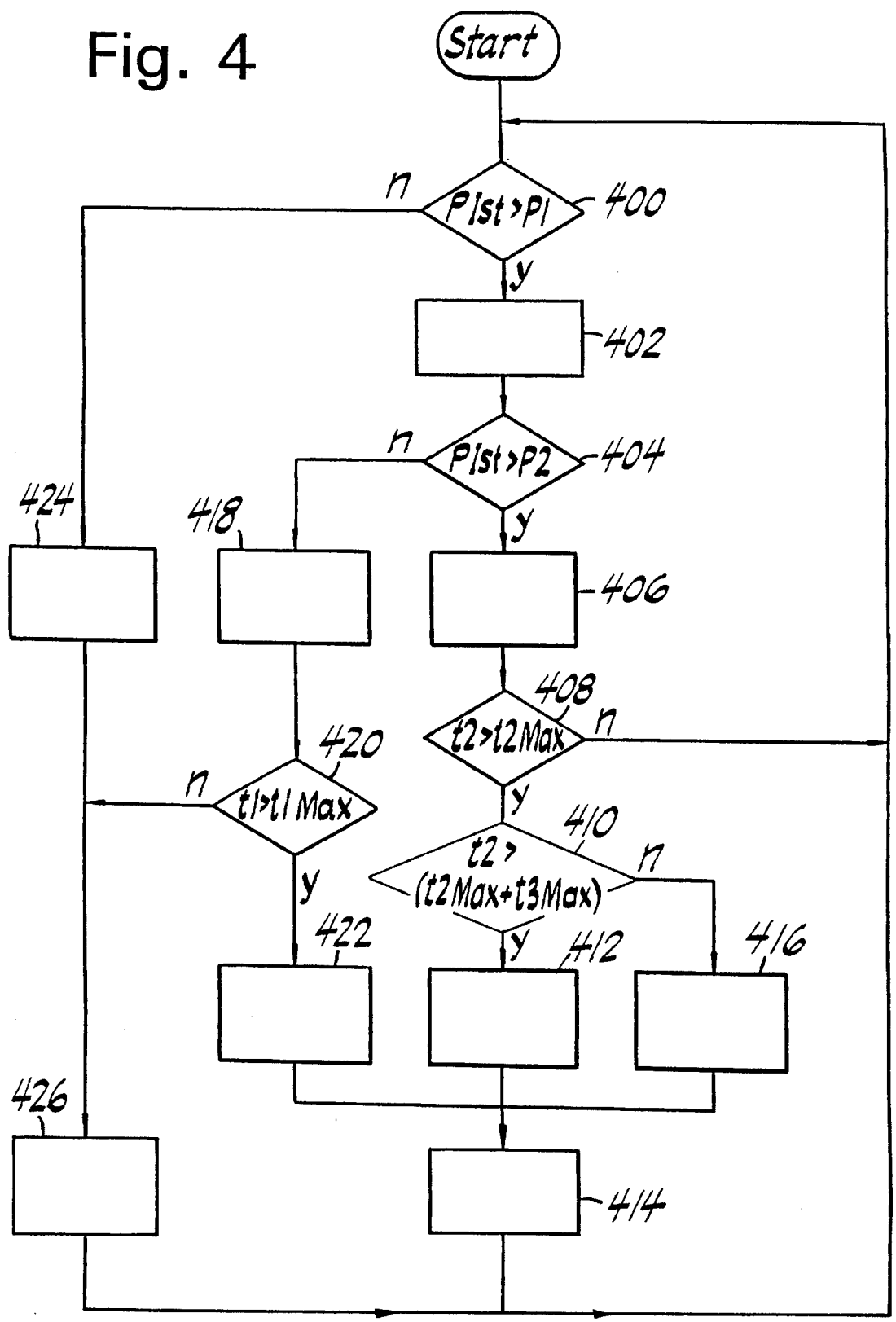
FIG. 4 shows an illustrative flow chart of the mode of operation of the protection system according to the present invention.

FIG. 4 shows an illustrative flow chart with reference to which the mode of operation of the protection system according to the present invention is explained below. In the first step 400, the system queries whether the actual boost-pressure value P Actual is greater than the threshold value P1. If this is the case, then, in the next step 402, a timer 1, which measures a time t1, is started. The timer 1 is started without being reset, and when an attempt is made to start the timer 1 when it is already running, it continues to run without being affected. Step 402 is followed by a step 404, in which the system queries whether the actual boost-pressure value P Actual is greater than the threshold value P2. If this is the case, then, in the next step 406, a timer 2 which measures a time t2 is started. The procedure involved in the starting of the timer 2 is exactly the same as that involved in the starting of timer 1. Step 406 is followed by a step 408, in which the system queries whether more than one time period t2Max has passed since the starting of timer 2. If this is the case, there follows a step 410. In step 410, the system queries whether more than one time period t2Max+ t3Max has passed since the starting of timer 2. If this is the case, there follows a step 412, in which the boost-pressure control is switched off or remains switched off. In step 412, a second skip pattern for the fuel metering is furthermore activated—if it is not already active. Step 412 is followed by a step 414 in which a fault lamp is activated to indicate that the boost-pressure control is malfunctioning. After step 414, the run through the flowchart begins again with step 400.

If the response to the query in step 410 is no, step 410 is followed by a step 416, in which the boost-pressure control, if still active, is switched off, and a first skip pattern for the fuel metering is activated. Step 416 is followed by step 414.

If the query in step 404 is not satisfied, there follows a step 418, in which the timer 2 is reset and the skipping of fuel metering is canceled. Step 418 is followed by a step 420, in which the system queries whether more than one time period t1Max has elapsed since the starting of timer 1. If this is the case, there follows a step 422, in which the boost-pressure control, if still active, is switched off. Step 422 is followed by step 414.

If the query in step 400 is not satisfied, there follows a step 424. In step 424—if it has not already been done—timer 1 is reset, the boost-pressure control is switched on, and the skipping of fuel metering is canceled. Step 424 is followed by a step 426, in which the fault lamp, if still on, is switched off. After step 426, the run through the flowchart starts again with step 400. Step 400 is also reached if the query in step 408 is not satisfied. Another path, namely that from step 420, also leads to step 426. This other path is taken if the query in step 420 is not satisfied.

The mode of operation of the protection system according to the present invention is explained below with reference to a number of typical runs through the flowchart:

1. There is no malfunction in the boost-pressure control:

In step 400, it is ascertained that the actual boost-pressure value P Actual is smaller than the threshold value P1 and step 424 is reached. There, timer 1 is reset, the boost-pressure control is switched on, and the skipping of fuel metering is canceled. These measures are required if a malfunction had previously been detected and corresponding protection measures are still active. For the same reason, if not off already, the fault lamp is switched off in the following step 426.

2. The boost-pressure control is to be switched off if the threshold value P1 is continually exceeded:

As soon as it is ascertained in step 400 that the threshold value P1 has been exceeded, timer 1 is started in the following step 402. In the case described here, the threshold value P2 is assumed not to have been exceeded, with the result that the query in the following step 404 is not satisfied, and step 418 is consequently executed. There, timer 2 is reset and, if the skipping of fuel metering is active, it is deactivated. If it is ascertained in the following step 420 that the time period t1 since the starting of timer- 1 is not yet greater than t1Max, no protective measures are resorted to yet. Step 426 follows then, in which merely the fault lamp, if still on, is switched off. If, however, the actual boost-pressure value P Actual has already been above the threshold value P1 for a time period t1 greater than t1Max, then step 420 is followed by step 422, in which the boost-pressure control is switched off, i.e. the bypass valve is opened. Then, in step 414, the fault lamp is switched on in order to indicate the malfunction in the boost-pressure control to the driver.

3. A greatly excessive actual boost-pressure value P Actual is detected for a relatively long period of time, making it necessary to skip the fuel metering:

In this case, one arrives by way of steps 400, 402, 404, 406 and 408 at step 410. In step 410, it is determined whether the increased boost-pressure has already existed for such a time that skipping of the fuel metering in accordance with the second skip pattern is required (step 412) or whether skipping of the fuel metering in accordance with the first skip pattern is initially sufficient (step 416). In both cases, the boost-pressure control is switched off, if it is not already off in any case, and fuel metering is then subjected to the appropriate skip pattern. Both step 412 and step 416 are followed by step 414, in which the fault lamp is switched on, if it had been off up to that point.

The skip patterns for the fuel metering can be predetermined in dependence upon the number of cylinders of the internal combustion engine 100. In predetermining the skip patterns, account is furthermore taken of the maximum torque drop which is permissible upon activation of skipping. Exemplary values for the first and second skip patterns for internal combustion engines having 4, 5, 6 and 8 cylinders are listed below. The skip patterns listed cause a maximum torque drop of about 15, measured from regular operation to the first skip pattern or from the first to the second skip pattern.

| | Skipped cylinders in the case of | |
|---|---|---|
| No. of cylinders | 1st skip pattern | 2nd skip pattern |
| 4 | every 5th | every 3rd |
| 5 | every 6th | every 4th |
| 6 | every 5th | every 5th + every subsequent one |
| 8 | every 5th | every 3rd |

To rule out an erroneous response of the protection system to the extent that is possible, all the protective measures (switching off of boost-pressure control, skipping of fuel metering in accordance with the first or second skip pattern) are only initiated if the threshold values P1 and P2 for the boost-pressure have been exceeded for longer than predeterminable time periods t1Max, t2Max and t2Max+ t3Max respectively. When the protective measures are withdrawn (steps 418 and 424 in the flow chart shown in FIG. 4), these time periods are however not taken into account; rather the withdrawal takes place immediately after the threshold values concerned have been undershot.

In an advantageous exemplary embodiment of the present invention, another safeguard against an erroneous response of the protection system is provided. The system checks whether the sensor 112 for detecting the boost-pressure P is operating satisfactorily. The protective measures described are only introduced if a malfunction of the sensor 112 can be ruled out.

In another exemplary embodiment of the present invention, the characteristic map 300 illustrated in FIG. 3 is omitted. Instead, the threshold value P2 is determined by means of an algorithm from the input variables speed n of the internal combustion engine 100 and temperature TL of the inducted air.

What is claimed is:

1. A protection system for a supercharged internal combustion engine, comprising:

a control unit for controlling a supercharging of the internal combustion engine as a function of a predetermined setpoint value, $P_{setpoint}$, when the internal combustion engine is in a normal operating condition, intervening in the controlling of the supercharging of the internal combustion engine when the internal combustion engine is in a first stage of an over-boosting condition, controlling a metering of fuel into the internal combustion engine when the internal combustion engine is in a second stage of the over-boosting condition, wherein the controlling of the metering of fuel includes skipping the metering of fuel to a predetermined cylinder of the internal combustion engine as a function of at least one predetermined skip pattern, a first predetermined skip pattern having a first skip frequency being activated when the internal combustion engine achieves the second stage of the over-boosting condition and a second predetermined skip pattern having a second skip frequency being activated when a signal determined as a function of the supercharging of the internal combustion engine indicates a predetermined condition, the second skip frequency being higher than the first skip frequency.

2. A method for protecting a supercharged internal combustion engine, comprising the steps of:

controlling a supercharging of the internal combustion engine as a function of a predetermined setpoint value, $P_{setpoint}$, when the internal combustion engine is in a normal operating condition;

intervening in the controlling of the supercharging of the internal combustion engine when the internal combustion engine is in a first stage of an over-boosting condition;

controlling a metering of fuel into the internal combustion engine when the internal combustion engine is in a second stage of the over-boosting condition;

wherein the step of controlling the metering of fuel includes skipping the metering of fuel to a predetermined cylinder of the internal combustion engine as a function of at least one predetermined skip pattern, a first predetermined skip pattern having a first skip frequency being activated when the internal combustion engine achieves the second stage of the over-boosting condition and a second predetermined skip pattern having a second skip frequency being activated when a signal determined as a function of the supercharging of the internal combustion engine indicates a predetermined condition, the second skip frequency being higher than the first skip frequency.

3. The method according to claim 2, wherein the first stage of the over-boosting condition includes when the signal determined as a function of the supercharging of the internal combustion engine exceeds a first threshold value, $P_1$, for a first predetermined period of time, $t_1 Max$, and wherein the second stage of the over-boosting condition includes when the signal determined as a function of the supercharging of the internal combustion engine exceeds a second threshold value, $P_2$, for a second predetermined period of time, $t_2 Max$.

4. The method according to claim 3, wherein the normal condition includes when the signal determined as a function of the supercharging of the internal combustion engine is less than the first threshold value, $P_1$.

5. The method according to claim 3, wherein the internal combustion engine is in one of the first stage and the second stage of the over-boosting condition only when a sensor for detecting the signal determined as a function of the supercharging of the internal combustion engine is determined to be in an operative condition.

6. The method according to claim 2, wherein the step of intervening in the controlling of the supercharging of the internal combustion engine includes switching off the supercharging of the internal combustion engine and adjusting a controlling element to a predetermined position, wherein the controlling element regulates the supercharging of the internal combustion engine.

7. The method according to claim 3, wherein the predetermined condition includes when the signal representing the supercharging of the internal combustion engine exceeds the second threshold value, $P_2$, after a third predetermined period of time, $t_3 Max$.

8. The method according to claim 2, wherein the at least one predetermined skip pattern is determined as a function of a number of cylinders in the internal combustion engine so that each of the number of cylinders is progressively skipped by the at least one predetermined skip pattern and a torque decrease caused by the at least one predetermined skip pattern is less than a predetermined amount.

9. The method according to 3, wherein the step of intervening in the controlling of the supercharging of the internal combustion engine includes canceling the intervening in the controlling of the supercharging of the internal combustion engine immediately after the signal determined as a function of the supercharging of the internal combustion engine drops below the first threshold value $P_1$, and wherein the step of controlling the metering of fuel includes canceling the controlling of the metering of fuel immediately after the signal determined as a function of the supercharging of the internal combustion engine drops below the second threshold value $P_2$.

10. The method according to claim 3, wherein the second threshold value $P_2$ is generated by a characteristic map that determines the second threshold value $P_2$ as a function of a speed of the internal combustion engine and a temperature of inducted air of the internal combustion engine.

11. The method according to claim 3, wherein the second threshold value $P_2$ is generated by a mathematical algorithm that determines the second threshold value $P_2$ as a function of a speed of the internal combustion engine and a temperature of inducted air of the internal combustion engine.

12. The method according to claim 3, wherein the first threshold value $P_1$ is determined by subtracting a predetermined value from the second threshold value $P_2$.

13. The method according to claim 3, wherein the signal determined as a function of the supercharging of the internal combustion engine represents one of a boost pressure, an air mass and an air flow rate.

* * * * *